United States Patent Office.

BENJAMIN BEST, OF DAYTON, OHIO.

Letters Patent No. 93,044, dated July 27, 1869.

IMPROVED COMPOUND FOR DESTROYING INSECTS.

The Schedule referred to in these Letters Patent and making part of the same.

*To all whom it may concern:*

Be it known that I, BENJAMIN BEST, of Dayton, in the county of Montgomery, and State of Ohio, have invented a new and useful Improvement in Tree-Protectors or Insect-Destroyers, for application to trees; and I do hereby declare that the following is a full, clear, and exact description of the same.

My improvement relates to compositions for application to the stems of trees, to prevent the ascent of insects; and the following description will enable persons to compound and apply the same.

To forty gallons of rain-water add two pounds of carbonate of ammonia, two pounds of potash, one gallon of whale-oil, one quart of pine-tar, and one pound of carbolic acid. Stir these ingredients well together, and apply by saturating a porous band three inches in thickness, bound loosely about the stem of the tree, about a foot above the ground.

For vines, or very small trees, the composition may be applied directly to the bark.

What I claim as my invention, and desire to secure by Letters Patent, is—

A composition compounded of the above-named ingredients, and applied for the protection of trees and vines, substantially as set forth.

In testimony whereof, I have signed my name to this specification, in the presence of two subscribing witnesses.

BENJAMIN BEST.

Witnesses:
    B. PICKERING,
    JACOB C. STALEY.